United States Patent
Schaal

(10) Patent No.: US 11,207,950 B2
(45) Date of Patent: Dec. 28, 2021

(54) AIR VENT

(71) Applicant: Fischer automotive systems GmbH & Co. KG, Horb a.N. (DE)

(72) Inventor: Falk Schaal, Loßburg (DE)

(73) Assignee: fischer automotive systems GmbH & Co. KG, Horb a.N. (DE)

( * ) Notice: Subject to any disclaimer, the term of this patent is extended or adjusted under 35 U.S.C. 154(b) by 0 days.

(21) Appl. No.: 16/918,180

(22) Filed: Jul. 1, 2020

(65) Prior Publication Data
US 2021/0001692 A1   Jan. 7, 2021

(30) Foreign Application Priority Data

Jul. 5, 2019 (DE) .................... 10 2019 118 243.3

(51) Int. Cl.
*B60H 1/34* (2006.01)

(52) U.S. Cl.
CPC ... *B60H 1/3414* (2013.01); *B60H 2001/3464* (2013.01)

(58) Field of Classification Search
CPC ......... B60H 1/34; B60H 1/3414; B60H 1/345
USPC ................. 454/143, 152, 155, 270
See application file for complete search history.

(56) References Cited

U.S. PATENT DOCUMENTS

| | | | | |
|---|---|---|---|---|
| 290,084 A * | 12/1883 | Maxfield | .................. | F24F 7/00 454/270 |
| 5,356,336 A * | 10/1994 | Stouffer | .................. | B60H 1/34 454/155 |
| 6,942,563 B2 * | 9/2005 | Pesch | .................. | B60H 1/3414 454/152 |
| 7,201,650 B2 * | 4/2007 | Demerath | ........... | B60H 1/3414 454/154 |
| 7,431,638 B2 * | 10/2008 | Natsume | ........... | B60H 1/00692 137/614.11 |
| 8,808,073 B2 * | 8/2014 | Tokunaga | .......... | B60H 1/00692 454/145 |
| 10,752,082 B1 * | 8/2020 | Kearney | ................ | B60H 1/345 |
| 11,007,844 B1 * | 5/2021 | Habte | ................ | B60H 1/0055 |
| 11,060,755 B2 * | 7/2021 | Minor | .................. | F24F 13/105 |
| 2004/0166794 A1 * | 8/2004 | Pesch | ..................... | F24F 13/06 454/152 |
| 2004/0198214 A1 * | 10/2004 | Karidis | ..................... | F24F 7/10 454/186 |

(Continued)

FOREIGN PATENT DOCUMENTS

| | | | |
|---|---|---|---|
| DE | 10 2008 050 180 A1 | 4/2010 | |
| DE | 10 2010 010 399 A1 | 8/2011 | |

(Continued)

OTHER PUBLICATIONS

Search Report for corresponding German Patent Application No. 10 2019 118 243.3, dated Feb. 13, 2020.

*Primary Examiner* — Vivek K Shirsat
*Assistant Examiner* — Ko-Wei Lin
(74) *Attorney, Agent, or Firm* — Renner Otto Boiselle & Sklar, LLP

(57) ABSTRACT

So as to guide an air current flowing out of an air vent for a motor vehicle, an air deflection element, which can be moved transversely in an air channel of the air vent, is disposed upstream of an air guide body in a flow direction, which includes air passages, for which the air deflection element includes congruent windows.

5 Claims, 3 Drawing Sheets

(56) References Cited

U.S. PATENT DOCUMENTS

| | | | | |
|---|---|---|---|---|
| 2005/0215190 | A1* | 9/2005 | Okumura | B60H 1/00857 |
| | | | | 454/121 |
| 2009/0023374 | A1* | 1/2009 | Suzuki | B60H 1/00692 |
| | | | | 454/126 |
| 2011/0217914 | A1 | 9/2011 | Marutschke | |
| 2012/0129443 | A1* | 5/2012 | Bastow | F24F 13/16 |
| | | | | 454/258 |
| 2013/0149952 | A1* | 6/2013 | Demerath | B60H 1/3421 |
| | | | | 454/155 |
| 2014/0287674 | A1* | 9/2014 | Badenhorst | F24F 13/26 |
| | | | | 454/265 |
| 2015/0126104 | A1* | 5/2015 | Ooes | B60H 1/3414 |
| | | | | 454/254 |
| 2016/0250909 | A1* | 9/2016 | Schneider | B60H 1/3421 |
| | | | | 454/155 |
| 2016/0361977 | A1* | 12/2016 | Freese | B60H 1/3414 |
| 2018/0056756 | A1* | 3/2018 | Schaal | B60H 1/3414 |
| 2018/0215238 | A1* | 8/2018 | Lee | B60H 1/3421 |
| 2018/0334015 | A1* | 11/2018 | Doll | B60H 1/345 |
| 2019/0168583 | A1* | 6/2019 | Dinant | B60H 1/3428 |
| 2019/0283544 | A1* | 9/2019 | Nakashima | B60H 1/3421 |
| 2019/0322153 | A1* | 10/2019 | Kim | B60H 1/00685 |
| 2020/0254850 | A1* | 8/2020 | Doll | B60H 1/3414 |
| 2020/0324625 | A1* | 10/2020 | Gothlin | B60H 1/3414 |
| 2020/0361282 | A1* | 11/2020 | Kim | B60H 1/34 |
| 2021/0122212 | A1* | 4/2021 | Daschiel | B60H 1/3407 |

FOREIGN PATENT DOCUMENTS

| | | |
|---|---|---|
| DE | 10 2010 017 553 A1 | 12/2011 |
| DE | 10 2018 211 375 A1 | 1/2020 |
| EP | 0455566 B1 | 6/1993 |
| EP | 3290245 A1 | 7/2018 |
| FR | 2 863 946 A1 | 6/2005 |
| FR | 2 961 583 A1 | 12/2011 |
| JP | S61-195 235 A | 12/1986 |

\* cited by examiner

AIR VENT

REFERENCE TO RELATED APPLICATIONS

This application claims priority under 35 USC § 119 to German Patent Application No. 10 2019 118 243.3, filed Jul. 5, 2019, the entire disclosure of which is incorporated herein by reference.

TECHNICAL FIELD OF THE INVENTION

The invention relates to an air vent. The air vent is provided to ventilate a passenger compartment of a motor vehicle, but may also be used elsewhere.

U.S. Pat. No. 7,201,650 B2 discloses an air vent for a motor vehicle, including a hollow spherical ring-shaped air channel, in which an air deflection element is disposed transversely to a flow direction, which has the shape of a cap of a rotational ellipsoid and can be moved transversely to the flow direction. So as to guide an air current through the air channel, the air deflection element is moved to one side, so that the air current has to flow eccentrically through a crescent-shaped space between the air deflection element and the air channel, whereby the air current flows obliquely out of an air outlet opening of the air channel. When the air deflection element is moved to the side in another direction, the outflow direction changes.

SUMMARY OF THE INVENTION

It is the object of the invention to propose an air vent having different air guidance.

The air vent includes an air channel, which narrows in a one-dimensional or two-dimensional manner toward an air outlet opening. In a, for example, horizontal air channel, "narrowing in a one-dimensional manner" shall be understood to mean that an inner cross-section of the air channel becomes either narrower or lower, and "narrowing in a two-dimensional manner" shall be understood to mean that the inner cross-section of the air channel becomes narrower and lower.

An air guide body is disposed in the air channel, having an outline area, as seen in a flow direction from an air inlet opening to the air outlet opening, that is smaller than the inner cross-section of the air channel at the location at which the air guide body is disposed, so that a space enclosing the air guide body in the air channel exists, through which an air current flows through the air channel.

In addition, an air deflection element is disposed in the air channel, which, in principle, can be any arbitrary body and, for example, is a disk disposed transversely to the flow direction in the air channel. As seen in the flow direction through the air channel, an outline area of the air deflection element is likewise smaller than the inner cross-section of the air channel at the location at which the air deflection element is present, so that a space enclosing the air deflection element, through which the air current flows through the air channel, also exists between the air deflection element and the air channel.

So as to guide the air current through the air channel, the air deflection element can be moved transversely to the flow direction through the air channel, and in a transverse direction of the air channel in which the air channel narrows. The latter is of importance when the air channel narrows in a one-dimensional manner toward the air outlet opening: the air deflection element can be moved in the direction in which an inner cross-section of the air channel decreases. The air deflection element can be movable transversely to the flow direction through the air channel, or with one component transversely to the flow direction and one component in the flow direction in the air channel.

According to the invention, the air guide body includes at least one air passage extending in the flow direction. The air passage in the air guide body extends such that a portion of the air flowing through the air channel flows through the air passage of the air guide body, provided the air passage is not blocked. By moving the air deflection element transversely to the flow direction, the air passage through the air guide body and the space between the air guide body and the air channel can be opened or blocked completely, or in regions. As a result, the air current in the air channel is more or less strongly guided to one side, whereby air flowing out of the air outlet opening is guided to one side, obliquely with respect to the flow direction.

One embodiment of the invention provides that the air deflection element includes an aperture, which is referred to as a window here, through which the air is able to flow. This means that the air flowing through the air channel flows not only past the outside of the circumference of the air deflection element, but also through the window of the air deflection element, provided the window is not blocked or covered, but is clear or open. As a result of the movement of the air deflection element transversely to the flow direction, the window of the air deflection element can be aligned with, partially aligned with, or brought out of alignment with the air passage of the air guide body, so that a cross-section of the air passage through the air guide body is substantially clear or closed. The cross-sections of the window of the air deflection element and of the air passage of the air guide body can be identical or different. In this embodiment of the invention, an air volume flowing through the air passage through the air guide body can be controlled by moving the air deflection element transversely to the flow direction.

A refinement of the invention provides for the air guide body to include multiple air passages, and for the air deflection element to include multiple windows, which can be aligned with the air passages by moving the air deflection element transversely to the flow direction. This embodiment of the invention increases an air volume flowing through the air guide body and/or allows the air current flowing through the air channel to be guided by air passages in the air guide body which extend in different directions.

One embodiment of the invention provides an air channel that narrows toward the air outlet opening in a two-dimensional manner transversely to the flow direction, and an air deflection element that is movable in the air channel in a two-dimensional manner transversely to the flow direction. This embodiment of the invention allows the air flowing out through the air outlet opening to be guided obliquely to the side in all directions.

A modified embodiment of the invention likewise provides an air channel that narrows toward the air outlet opening in a two-dimensional manner transversely to the flow direction, and two air deflection elements that are movable in different directions transversely to the flow direction through the air channel. The air deflection elements can be disposed consecutively in the air channel in the flow direction, for example with or without distance. These can be used to guide the air current in the air channel to the side in any arbitrary direction, similarly to the air deflection element that is movable in a two-dimensional manner transversely to the flow direction, and the air flowing out of the air outlet opening can thereby likewise be guided obliquely to the side, with respect to the flow direction, in any arbitrary direction.

The air deflection element is preferably disposed on an incident flow side of the air guide body, which is to say upstream of the air guide body in the flow direction through the air channel.

The features and feature combinations, designs and embodiments of the invention mentioned above in the description, and the features and feature combinations mentioned hereafter in the description of the figures and/or shown in a figure, can be used not only in the respective indicated or shown combinations, but also in other essentially arbitrary combinations, or alone. Embodiments of the invention that do not include all the features of a dependent claim are possible. It is also possible to replace individual features of a claim with other disclosed features or feature combinations.

BRIEF DESCRIPTION OF THE DRAWINGS

The invention will be described hereafter in greater detail based on one exemplary embodiment shown in the drawings. In the drawings.

Figure 1:
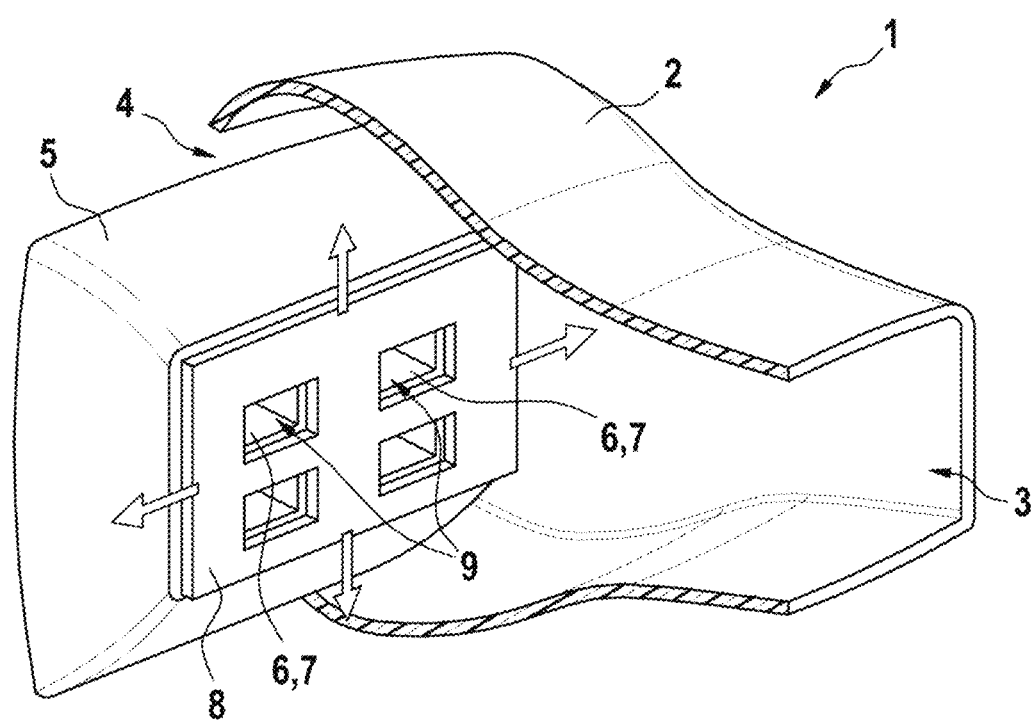
FIG. 1 shows an air vent according to the invention in a perspective illustration, including an air channel in a cutaway view in a longitudinal center plane.

The drawing is a simplified and schematic illustration to describe, and provide an understanding of, the invention.

DETAILED DESCRIPTION OF THE INVENTION

The air vent 1 according to the invention shown in the drawing includes a rectangular tube-shaped air channel 2, including an air inlet opening 3 at one end and an air outlet opening 4 at an opposing end. The air channel 2 widens in a two-dimensional arcuate manner in a flow direction through the air channel 2 from the air inlet opening 3 to the air outlet opening 4, and subsequently narrows, likewise in a two-dimensional arcuate manner, toward the air outlet opening 4. "Widens in a two-dimensional manner" shall be understood to mean that, with an assumed horizontal arrangement of the air channel 2, an inner cross-section of the air channel 2 both becomes wider and increases in terms of the height thereof, and "narrows in a two-dimensional manner" shall be understood to mean that the inner cross-section of the air channel 2 becomes narrower and flatter. The shape of the air channel 2, and in particular the rectangular shape, is not mandatory for the invention.

An air guide body 5 is disposed in the widening and subsequently narrowing region of the air channel 2, having an outline area, as seen in the flow direction, that is smaller than the inner cross-section of the air channel 2 at the location at which the air guide body 5 is disposed, so that an annular, and in the exemplary embodiment a rectangular, space, which surrounds the air guide body 5 in the air channel 2, exists between the air guide body 5 and an inner wall of the air channel 2, through which air flowing through the air channel 2 flows. In the exemplary embodiment, circumferential surfaces of the air guide body 5 have a shape of the inner wall of the air channel 2 which is not proportionally reduced, in the region in which the air guide body 5 is disposed.

Figure 2:
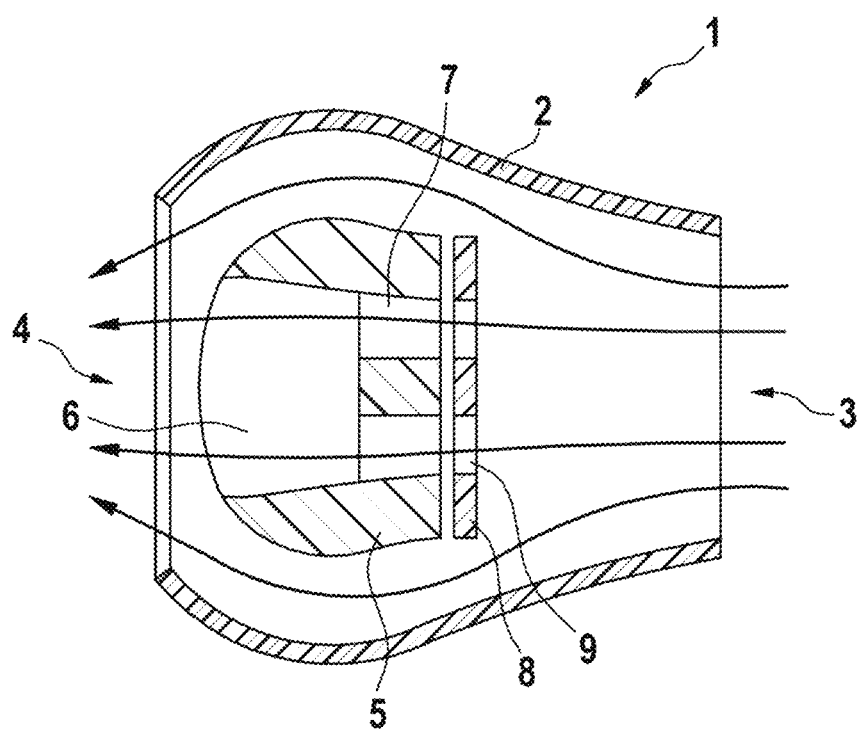
FIGS. 2 and 3 show a longitudinal sectional view of the air vent from FIG. 1, including an air deflection element in different positions.
Figure 3:
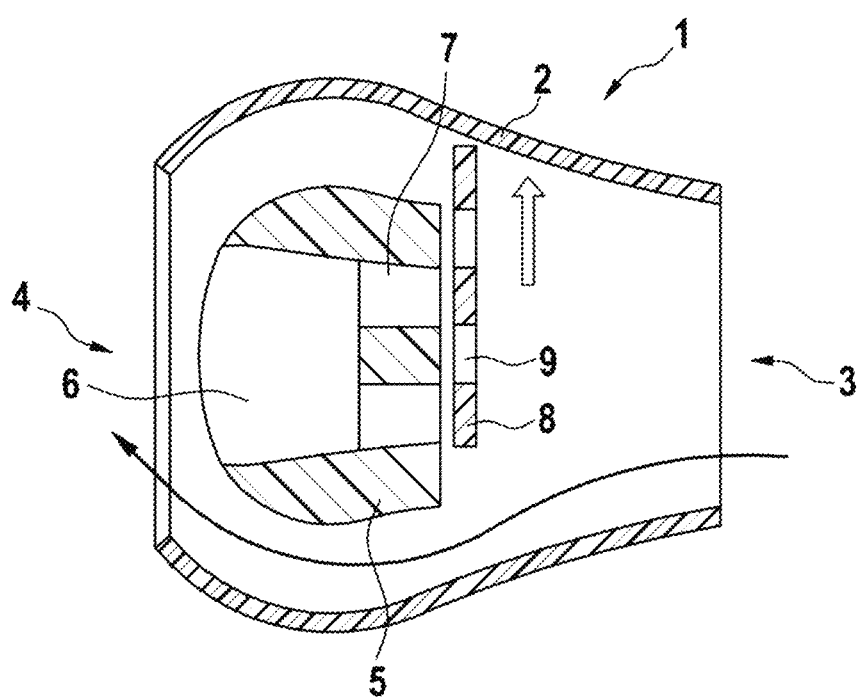

As is apparent from FIGS. 2 and 3, the air guide body 5 includes an air passage 6 that extends in the flow direction through the air channel 2 and that, on an incident flow side facing the air inlet opening 3 of the air channel 2, is divided into four openings 7. The air passage 6 and the openings 7 thereof have rectangular cross-sections, wherein a cross-sectional surface of the air passage 6 outside the openings 7 is larger than a sum of the cross-sectional surfaces of the openings 7. The openings 7 are disposed in a rectangular grid. The rectangular shape of the air passage 6 is not mandatory for the invention, nor is the fact that the air passage 6 includes four openings 7. For example, an air passage 6 through the air guide body 5 having only one opening on the incident flow side (not shown) is also possible.

At or upstream of the incident flow side of the air guide body 5 which faces the air inlet opening 3 of the air channel 2, an air deflection element 8 is disposed in the air channel 2 of the air vent 1 according to the invention. In the exemplary embodiment, the air deflection element 8 is a rectangular plate having approximately a size and shape of the incident flow side of the air guide body 5, which is disposed transversely to the flow direction in the air channel 2.

As is illustrated by the four arrows in FIG. 1, the air deflection element 8 can be moved in a two-dimensional manner in the air channel 2, transversely to the flow direction. With an assumed horizontal arrangement of the air channel 2, the air deflection element 8 can thus be moved to the side and vertically in the air channel 2, which is to say in the directions in which the air channel 2 widens and subsequently narrows again.

The air deflection element 8 has as many apertures, referred to as windows 9 here, as the air passage 6 through the air guide body 5 has openings 7. The shape and size of the windows 9 correspond to cross-sections of the openings 7, and the windows 9 are disposed so as to be aligned with the openings 7 when the air deflection element 8 is located centrally in front of the incident flow side of the air guide body 5, as is apparent from FIGS. 1 and 2. It is not mandatory for the invention that the air deflection element 8 has as many windows 9 as the air passage 6 through the air guide body 5 has openings 7 and/or that the windows 9 are as large as cross-sections of the openings 7 and/or that the windows 9 are disposed in the air deflection element 8 so that all the windows 9, in one position of the air deflection element 8, are aligned with the openings 7 of the air passage 6.

When the air deflection element 8 is in the central position in the air channel 2 shown in FIGS. 1 and 2, the air deflection element 8 is surrounded by a space between an inner wall of the air channel 2 and the air deflection element 8, which encloses the air deflection element 8 and through which air flowing through the air channel 2 flows, as is shown by the flow arrows in FIG. 2.

When the windows 9 of the air deflection element 8, as shown in FIGS. 1 and 2, are aligned with the openings 7 of the air passage 6 through the air guide body 5, air flows through the air channel 2, and also through the openings 7 and the air passage 6, as is likewise shown by way of the flow arrows in FIG. 2. In this position of the air deflection element 8, air flows in the flow direction through the air channel 2 out of the air outlet opening 4 of the air channel 2.

When moved to the side and/or up or down in any arbitrary direction transversely in the flow channel 2 and transversely to the flow direction through the air channel 2, the air deflection element 8 blocks or closes the space between the air guide body 5 and the inner wall of the air channel 2 at the corresponding circumferential location so that, in this region, less air, or when the air deflection element 8, as is apparent in FIG. 3, is moved to the side, or up or down toward the inner side of the air channel 2, no air flows through the space between the air guide body 5 and the inner wall of the air channel 2. The air flowing through the air channel 2 flows through the space between the air guide body 5 and an inner wall of the air channel 2 in the circumferential sections that remain clear, as is shown by the flow arrow in FIG. 3. As a result of the air channel 2 narrowing toward the air outlet opening 4, the air flowing out of the air channel 2 through the air outlet opening 4 is guided to one side obliquely with respect to the flow direction, so that the movement of the air deflection element 8 allows a direction of the air flowing out of the air vent 1 to be guided obliquely to the side in any arbitrary direction.

Due to the movement of the air deflection element 8 to the side, the windows 9 of the air deflection element 8 are brought partially or completely out of alignment with the openings 7 of the air passage 6 in the air guide body 5, so that the flow through the openings 7 of the air passage 6, and the air passage 6 as a whole, is restricted and subsequently interrupted.

The invention claimed is:

1. An air vent comprising:
    an air channel that narrows toward an air outlet opening;
    an air guide body, which is disposed in the air channel and has an outline area, as seen in a flow direction, that is smaller than an inner cross-section of the air channel at a location at which the air guide body is disposed, so that air flowing through the air channel flows around the air guide body; and
    an air deflection element, having an outline area, as seen in the flow direction, that is smaller than an inner cross-section of the air channel at a location at which the air deflection element is disposed, and wherein the air deflection element is movable transversely to the flow direction and located at a location in which the air channel narrows,
    wherein the air guide body includes at least one air passage extending in the flow direction, and the at least one air passage through the air guide body and a space between the air guide body and an inner wall of the air channel are configured to be opened or closed in regions by moving the air deflection element transversely to the flow direction through the air channel, and
    wherein the air deflection element includes a window, which is configured to be aligned with, or brought out of alignment with, the at least one air passage of the air guide body by moving the air deflection element transversely to the flow direction.

2. The air vent according to claim 1, wherein the at least one air passage includes a plurality of air passages, and the air deflection element includes a plurality of windows, which are configured to be aligned with the plurality of air passages by moving the air deflection element transversely to the flow direction.

3. The air vent according to claim 1, wherein the air channel narrows toward the air outlet opening, and the air deflection element is configured to be moved in the air channel in a two-dimensional manner transversely to the flow direction.

4. The air vent according to claim 1, wherein the air deflection element is disposed on an upstream side of the air guide body.

5. An air vent comprising:
    an air channel that narrows toward an air outlet opening;
    an air guide body, which is disposed in the air channel and has an outline area, as seen in a flow direction, that is smaller than an inner cross-section of the air channel at a location at which the air guide body is disposed, so that air flowing through the air channel flows around the air guide body; and
    an air deflection element, having an outline area, as seen in the flow direction, that is smaller than an inner cross-section of the air channel at a location at which the air deflection element is disposed, and wherein the air deflection element is movable transversely to the flow direction and located at a location in which the air channel narrows,
    wherein the air guide body includes at least one air passage extending in the flow direction, and the at least one air passage through the air guide body and a space between the air guide body and an inner wall of the air channel are configured to be opened or closed in regions by moving the air deflection element transversely to the flow direction through the air channel, and
    wherein the air channel narrows toward the air outlet opening, and the air deflection element is configured to be moved in the air channel in a two-dimensional manner transversely to the flow direction.

* * * * *